United States Patent [19]

Lahrman

[11] Patent Number: 5,794,941
[45] Date of Patent: Aug. 18, 1998

[54] PISTON RING ASSEMBLY

[75] Inventor: John C. Lahrman, Richmond, Ind.

[73] Assignee: Dana Corporation, Toledo, Ohio

[21] Appl. No.: 456,360

[22] Filed: Jun. 1, 1995

[51] Int. Cl.[6] .................................................. F16J 9/06
[52] U.S. Cl. ...................... 277/175; 277/138; 277/139; 277/140; 277/141; 277/142
[58] Field of Search .................... 277/139, 138, 277/140, 141, 142, 175

[56] References Cited

U.S. PATENT DOCUMENTS

| | | | |
|---|---|---|---|
| 2,293,450 | 8/1942 | Wilkening | 309/43 |
| 2,904,377 | 9/1959 | Endres et al. | 309/40 |
| 2,967,746 | 1/1961 | Braendel | 309/44 |
| 3,281,156 | 10/1966 | Mayhew et al. | 277/140 |
| 3,326,561 | 6/1967 | Braendel | 277/141 |
| 3,370,858 | 2/1968 | Braendel | 277/139 |
| 3,814,444 | 6/1974 | Johnson et al. | 277/139 |
| 4,145,060 | 3/1979 | Stecher et al. | 277/139 |
| 4,161,321 | 7/1979 | Hendrixon et al. | 277/216 |
| 4,210,338 | 7/1980 | Collings, Jr. | 277/76 |
| 4,214,762 | 7/1980 | McCormick et al. | 277/138 |
| 4,473,232 | 9/1984 | Umeha et al. | 277/216 |
| 4,497,497 | 2/1985 | Berti et al. | 277/163 |
| 4,522,412 | 6/1985 | Kubo | 277/138 |
| 4,585,237 | 4/1986 | Koop | 277/139 |
| 4,796,898 | 1/1989 | Brauers et al. | 277/216 |
| 5,129,661 | 7/1992 | Ono et al. | 277/141 |
| 5,238,255 | 8/1993 | Sytsma | 277/139 |
| 5,241,748 | 9/1993 | Ishida | 29/888.074 |
| 5,295,696 | 3/1994 | Harayama et al. | 277/138 |
| 5,304,262 | 4/1994 | Karaoke et al. | 148/589 |

*Primary Examiner*—William A. Cuchlinski, Jr.
*Assistant Examiner*—Christina Annick
*Attorney, Agent, or Firm*—Rader, Fishman & Grauer

[57] ABSTRACT

An improved piston ring assembly comprises a double-offset expander spring and a piston ring. The expander spring has a first wave portion that is continuously engaged in an annular groove of a piston body, the wave portion having an axial extent that is nearly identical to that of the groove. The spring also has a second wave portion with an axial extent less than that of the first wave portion. The second wave portion is adapted to engage a mating slot of the piston ring. The expander spring, rather than the piston ring, is primarily relied upon to engage the groove of the piston body to eliminate assembly slippage and provide axial centering. Thus, the radial thickness of the piston ring may be greatly reduced to improve conformability and reduce oil consumption.

13 Claims, 2 Drawing Sheets

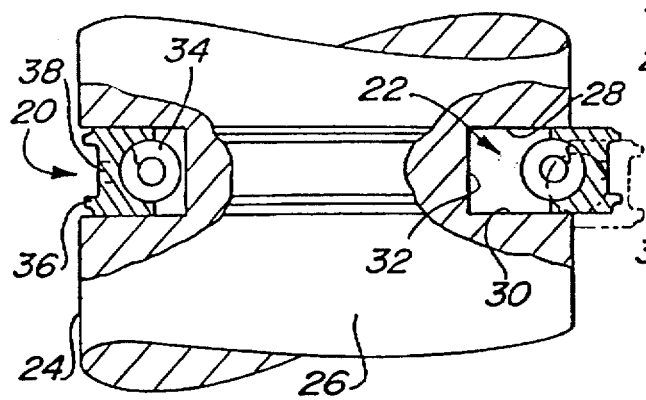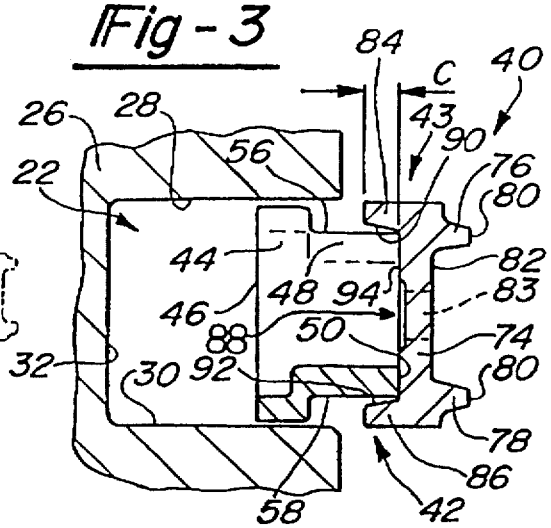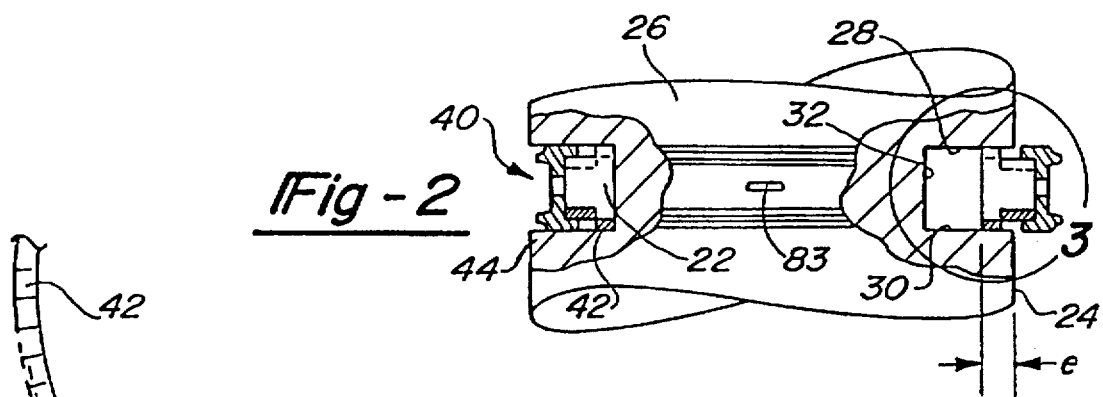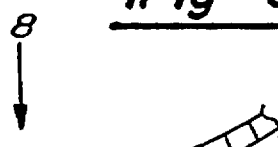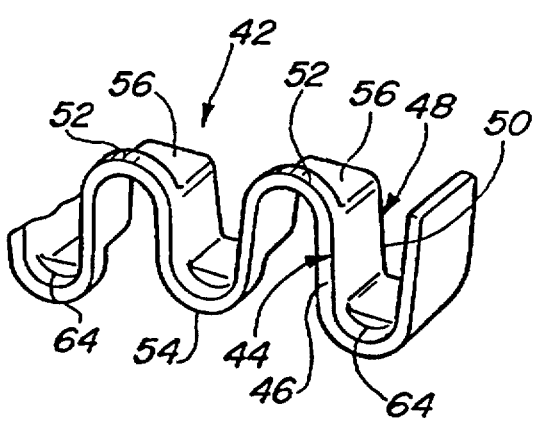

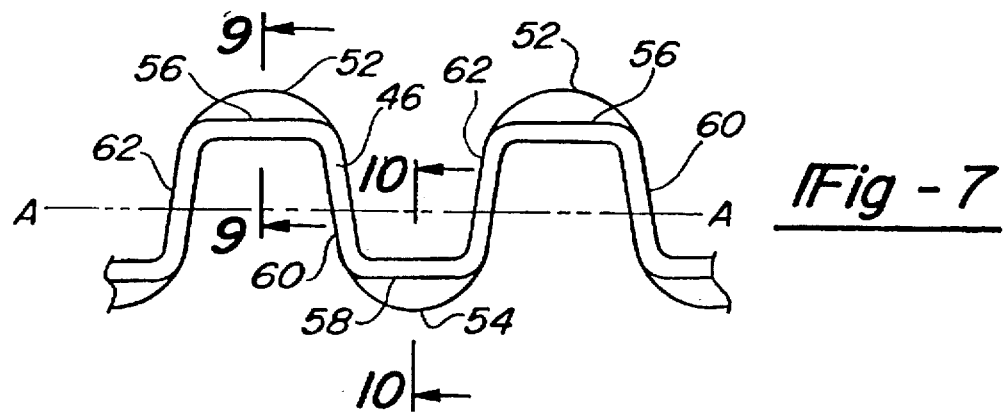
_Fig - 7_
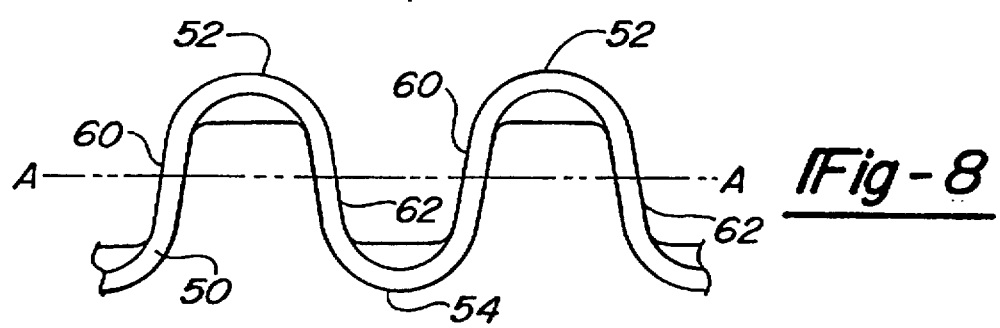
_Fig - 8_
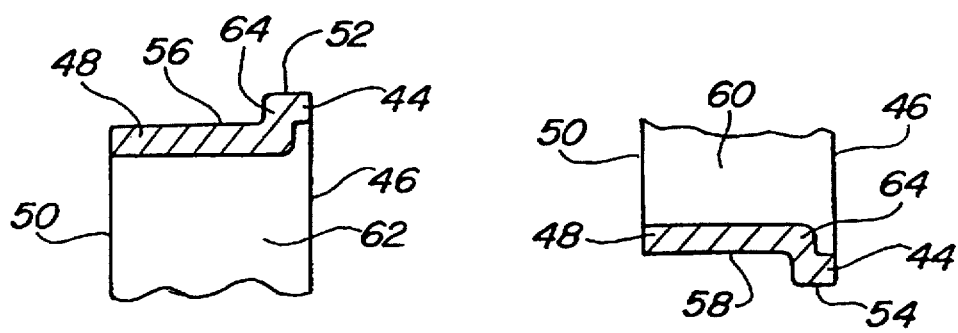
_Fig - 9_   _Fig - 10_
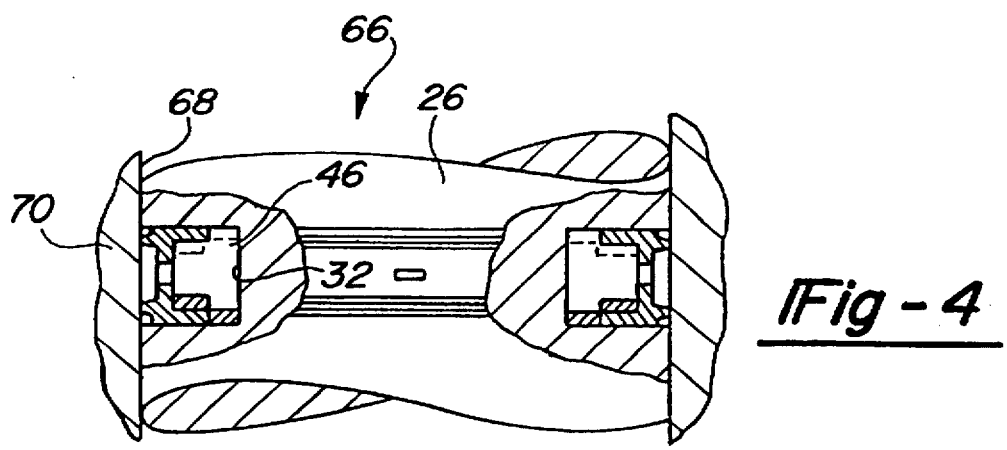
_Fig - 4_

5,794,941

PISTON RING ASSEMBLY

FIELD OF THE INVENTION

The present invention relates to a piston ring assembly and more particularly to an assembly comprising a double offset expander spring and a piston ring with a generally H-shaped cross-section having a thin central web.

BACKGROUND OF THE INVENTION

Piston rings are mounted in annular grooves of pistons which reciprocate within the combustion bores of the cylinders of internal combustion engines. One function of piston rings is to scrape excess lubricating oil from the cylinder wall and to assure proper oil film thickness on the cylinder wall consistent with necessary lubrication. If piston rings are not used, there is a tendency for an upward movement of oil toward the combustion chamber, interfering with engine operation, and creating undesirable pollution.

Prior art FIG. 1 illustrates a conventional piston ring assembly 20 mounted within an annular groove 22 disposed about an outer peripheral surface 24 of piston body 26. Piston body 26 reciprocates within a combustion bore (not shown) of an internal combustion engine (not shown). Groove 22 includes axially spaced upper and lower walls 28 and 30, and a groove root 32 disposed therebetween. Assembly 20 is difficult to install into a combustion bore when used with a conventional coil or serpentine expander spring 34 and the usual annular parted piston ring 36 having a generally H-shaped cross section and a relatively thick central web 38. As shown in FIG. 1, there is a tendency for the ring to assume a non-concentric position within the groove wherein a portion of assembly 20 actually contacts groove root 32 and an oppositely disposed portion has minimal engagement within groove 22. At times, as shown in phantom, there may even be a lack of engagement, resulting in slippage which prevents installation.

Conventional piston ring assemblies with piston rings having relatively thick central webs are disfavored because they lack conformability with a mating cylinder wall. Reducing the radial extent and thickness of piston rings provide improved conformability, which reduces oil consumption. Yet, reducing the radial extent of a piston ring body further aggravates installation. Assemblies using such a piston ring body with conventional expander springs have proven notoriously difficult to install because of slippage.

SUMMARY OF THE INVENTION

An improved piston ring assembly, which is constantly engaged within an annular groove of a piston body, includes an annular split double-offset expander spring and a piston ring. The expander spring has an inner periphery and an outer periphery, a first wave portion extending about the inner periphery and a second wave portion extending about the outer periphery. The first wave portion continuously engages the groove of the piston body even upon maximum radial displacement or eccentricity of the piston ring assembly. The outer axial surfaces of the first wave portion are adapted to be in close proximity with the upper and lower walls of the groove to provide axial centering of the assembly. The axial extent of the second wave portion is less than that of the first, to nest into the piston ring.

The piston ring has a generally H-shaped cross section with a thin central web. The ring includes a pair of axially spaced radially outwardly extending projections that terminate in a cylinder wall engaging surface. An oil-collecting channel is defined by the projections and the web. A pair of axially spaced rails extends radially inwardly. The rails and the web define a spring-receiving slot.

The second wave portion of the expander spring engages the piston ring slot, with the outer periphery of the expander spring contacting the web. The second wave portion and the piston ring are adapted to selectively extend away from an outer peripheral surface of the piston body. However, when the piston ring does engage the piston body groove, the axial extent of the piston ring corresponds closely to that of the first wave portion to provide additional axial centering to the assembly.

Unlike the prior art, the present invention relies on the double offset expander spring to provide continuous engagement of the piston ring in the piston body groove and to provide axial centering for the assembly. Thus, radial displacement does not result in a lack of engagement between the assembly and piston body groove which would prevent the insertion of the piston body and piston ring assembly into a combustion bore. Further, by having the expander spring continuously engage the piston ring slot rather than having the piston ring engage the piston body groove, the necessary radial extent, and particularly the thickness of the piston ring web, is greatly reduced. Conformability is improved and oil consumption is correspondingly reduced.

BRIEF DESCRIPTION OF THE DRAWINGS

The features and inventive aspects of the present invention will become more apparent upon reading the following detailed description, claims, and drawings, of which the following is a brief description:

FIG. 1 is a prior art partial cross-sectional view of a conventional piston ring assembly mounted in a groove of a piston, showing both a non-concentric position of the assembly and potential slippage outside of the piston groove.

FIG. 2 is a partial cross-sectional view of an improved piston ring assembly according to the present invention, wherein a double-offset expander spring works in combination with an improved piston ring having reduced radial thickness to provide improved conformability without installation slippage.

FIG. 3 is an enlarged cross sectional view of the piston ring assembly as shown by the encircled region 3 of FIG. 2.

FIG. 4 is a cross-sectional view of a piston with the inventive piston ring assembly installed in a cylinder combustion bore of an internal combustion engine FIG. 5 is a plan view of the double-offset expander spring.

FIG. 6 is a perspective view of a portion of the double-offset expander spring.

FIG. 7 is a side view of the outer periphery of the double-offset expander ring in the direction of arrow 7 of FIG. 5.

FIG. 8 is a side view of the inner periphery of the double-offset expander ring in the direction of arrow 8 of FIG. 5.

FIG. 9 is a cross-sectional view of the double-offset expander ring in the direction of arrows 9—9 of FIG. 7.

FIG. 10 is a cross-sectional view of the double offset expander ring in the direction of arrows 10—10 of FIG. 7.

DETAILED DESCRIPTION OF A PREFERRED EMBODIMENT

FIGS. 2 and 3 illustrate a piston ring assembly 40 engaging an annular groove 22 disposed about an outer peripheral surface 24 of piston body 26. Piston body 26 may be the same as that used with conventional piston ring assembly 20, discussed in the Background of the Invention. Piston body 26 reciprocates within a combustion bore of an internal combustion engine, as shown in FIG. 4, and discussed further below. Groove 22 includes axially spaced upper and lower walls 28 and 30, and a groove root 32 disposed therebetween. Assembly 40 comprises a split annular double-offset expander spring 42 and a split annular piston ring 43.

Expander spring 42 is shown in greater detail in FIGS. 5 through 10. As shown in FIG. 5, spring 42 has a generally annular shape so that it may be received within groove 22 of piston body 26. FIG. 6 illustrates that double offset expander spring 42 comprises a generally sinusoidal wave portion 44 at an inner periphery 46 and a trapezoidal or clipped wave portion 48 at an outer periphery 50. Sinusoidal wave portion 44 and clipped wave portion 48 extend about the circumference of the spring.

A view of the outer periphery 50 of spring 42 is shown in FIG. 7 while a view of inner periphery 46 is shown in FIG. 8. Each repeating segment of sinusoidal wave portion 44 is defined by two axially disposed upper crests 52 alternating with an equal, but oppositely axially disposed lower crest 54. Crests 52 and 54 are equally spaced with respect to an axial centerline A—A. Similarly, each repeating segment of clipped wave portion 48 is defined by two axially disposed upper shoulders 56 alternating with equally, but oppositely axially disposed lower shoulders 58. Upper shoulders 56 and lower shoulders 58 are equally spaced from and generally parallel to centerline A—A.

Preferably, double-offset expander spring 42 is stamped from a single piece of sheet metal including 200 or 300 series stainless steel having a uniform thickness. Once stamped, there is typically little or no material interruption in a transition zone 64 between crest 52 and shoulder 56 or crest 54 and shoulder 58 resulting from the shearing action of stamping. Wave portions 44 and 48 share common leading and trailing wave edges 60 and 62 that extend from inner periphery 46 to outer periphery 50. Crests 52 and 54 have a greater axial extent than corresponding shoulders 56 and 58, thereby creating the double-offset.

Finally, as best illustrated in FIGS. 6, 9 and 10, the radial extent of clipped wave portion 48 is preferably greater than the corresponding radial extent of sinusoidal wave portion 44. These figures also show transition zone 64, the axial displacement between crests 52, 54 and corresponding shoulders 56, 58 as well as the material uniformity of leading and trailing edges 60 and 62.

As shown in FIGS. 2 through 4, double-offset expander spring 42 engages groove 22. The axial extent of sinusoidal wave portion 44 is only slightly less than the corresponding axial extent of groove 22, bringing crests 52 into close proximity with upper wall 28 and crests 54 into close proximity with lower wall 30. Wave portion 44 thus cooperates with walls 28 and 30 to axially center piston ring assembly 40 within groove 22.

A maximum radial displacement or non-concentricity of assembly 40 is illustrated in FIG. 2. When inner periphery 46 is in facial contact with groove root 32 on one side of piston body 26, double-offset expander spring 42 is still engaged with the opposite side of the piston groove with a radial engagement "e". Continued radial engagement with groove 22 even when there is maximum non-concentricity, in combination with the axial centering provided by sinusoidal wave portion 44, eliminates slippage of piston ring assembly 40. Thus, as shown in FIG. 4, piston body 26 and piston ring assembly 40 may be easily installed into a bore 66 of a cylinder, bore 66 defined by an inner peripheral surface 68 of a cylinder wall 70. When installed, spring 42 biases piston ring 43 radially outwardly, the inner periphery 46 of spring 42 remaining radially spaced from groove root 32 around the entire circumference of piston body 26.

An additional desirable feature of assembly 40 is the ability to minimize the cross-sectional radial thickness of piston ring 43, and particularly the thickness of a central web 74. Web 74 is thinner than conventional web 38, illustrated in FIG. 1. In one preferred embodiment web 74 has a thickness between 0.022 and 0.028 inches (0.56 and 0.71 mm), while piston ring 43 has an overall thickness between 0.090 and 0.120 inches (2.29 and 3.05 mm). A reduced thickness improves conformability of the piston ring with peripheral surface 68 of cylinder wall 70, lowering oil consumption.

Piston ring 43 is shown in greater detail in FIG. 3. Ring 43 includes a pair of axially spaced radially outwardly extending projections 76 and 78 that terminate in cylinder wall-engaging surfaces 80. A channel 82 is defined by projections 76, 78 and web 74. Channel 82 collects and directs lubricating oil scraped from cylinder wall 70 to one of a plurality of oil drainage passages 83 axially centered and circumferentially spaced about ring 43 within web 74 (see also FIG. 2).

Piston ring 43 also includes a pair of axially spaced radially inwardly extending rails 84 and 86. Rails 84 and 86 define the outer (i.e., upper and lower) axial surfaces of ring 43. Ring 43 has an axial extent corresponding generally to that of sinusoidal wave portion 44 of expander spring 42. Therefore, when ring 43 is received within groove 22, it also performs an axial centering function as shown in FIG. 4.

A generally wedge-shaped slot 88 is defined by rails 84, 86 and web 74. Opposed walls 90 and 92 of rails 84 and 86 may each be inclined at a slight angle while a floor 94 of groove 88 defined by a portion of web 74 is parallel to cylinder wall 70. Floor 94 has an axial extent corresponding to or greater than the axial extent of second wave portion 48. Preferably, the axial extent of each is almost equal. As a result, walls 90 and 92 are inclined to prevent interference with shoulders 56, 58 of expander spring 42 when the expander spring is inserted into slot 88. In a preferred embodiment, the angle of inclination is between three and seven degrees. Clipped wave portion 48 is received in slot 88 to a capture depth "c" with outer periphery 50 engaging floor 94 of web 74.

In the prior art discussed above and shown in FIG. 1, conventional piston ring 38 must be maintained within piston ring groove 22 before assembly, or installation of the piston body 26 and piston ring assembly 20 into a combustion bore becomes impossible. To prevent slippage of assembly 20 before assembly, the radial extent of piston ring 38 should be maximized. The disadvantage of such an approach, however, is that conformability is reduced, increasing oil consumption. In contrast, the present invention relies on double-offset expander spring 42 to provide continuous engagement of piston ring assembly 40 with groove 22 and to provide axial centering. By having expander spring 42 engage slot 88 of piston ring 43 rather than having the piston ring mounted in groove 22 of piston body 26, the radial extent, and particularly the thickness, of web 74 may be greatly reduced. Conformability is improved while oil consumption is correspondingly reduced.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A piston ring assembly adapted to engage an annular groove of a piston body, the piston body axially adapted to reciprocate within a cylinder having an inner cylinder wall defining a bore that receives the piston body, the assembly comprising:

an annular, split, double-offset, expander spring with an inner periphery and an outer periphery, a first wave portion extending about said inner periphery and a second wave portion extending about said outer periphery, the axial extent of said second wave portion being less than the axial extent of said first wave portion, wherein said first wave portion has a generally sinusoidal shape and said second wave portion has a generally trapezoidal shape; and a split annular piston ring having a generally H-shaped cross section with a thin central web, said ring including a pair of axially spaced radially outwardly extending projections that terminate in a cylinder wall-engaging surface, a channel defined by said projections and said web, a pair of axially spaced radially inwardly extending rails, and a slot defined by said rails and said web, whereby said second wave portion of said expander spring engages said slot of said piston ring.

2. A piston ring assembly as recited in claim 1, wherein said first wave portion of said expander spring continuously engages the groove of the piston body even upon maximum radial displacement of said assembly while said second wave portion and said piston ring selectively extend away from an outer peripheral surface of the piston body.

3. A piston ring assembly as recited in claim 2, wherein outer axial surfaces of said first wave portion are in close proximity with opposing axial walls of the groove.

4. A piston ring assembly as recited in claim 2, wherein said slot includes a floor, said floor having an axial extent corresponding to said axial extent of said second wave portion.

5. A piston ring assembly as recited in claim 4, wherein opposed slot-defining walls of said rails are inclined between three and seven degrees such that said slot of said piston ring is wedge-shaped.

6. A piston ring assembly as recited in claim 1, wherein said web has a thickness between 0.022 and 0.028 inches.

7. A piston ring assembly as recited in claim 1, wherein said first wave portion of said expander spring has repeating segments each defined by two axially disposed upper crests alternating with an equally, but oppositely axially disposed lower crest, and said second wave portion of said expander spring has repeating segments each defined by two axially disposed upper shoulders alternating with an equally, but oppositely axially disposed lower shoulder, said leading and trailing edges extending at least between alternating adjacent shoulders.

8. A piston ring assembly as recited in claim 7, wherein said first and second wave portions share leading and trailing edges that extend between said inner and outer peripheries of said expander spring.

9. A piston ring assembly as recited in claim 8, wherein a transition zone is defined between said crests and said corresponding shoulders.

10. A piston ring assembly adapted to engage an annular groove of a piston body, the piston body reciprocating within a cylinder having an inner cylinder wall defining a bore that receives the piston body, the assembly comprising:

an annular, split, double-offset, expander spring with an inner periphery and an outer periphery, a first wave portion extending about said inner periphery, wherein said first wave portion of said expander spring continuously engages the groove of the piston body even upon maximum radial displacement of said assembly, with outer axial surfaces of said first wave portion in close proximity with opposing axial walls of the groove, and a second wave portion extending about said outer periphery, an axial extent of said second wave portion being less than an axial extent of said first wave portion, wherein said first wave portion has a repeating generally sinusoidal wave shape and said second wave portion has a repeating generally trapezoidal wave shape; and a split annular piston ring having a generally H-shaped cross section with a thin central web, said ring including a pair of axially spaced radially outwardly extending projections that terminate in a cylinder wall-engaging surface, a channel defined by said projections and said web, a pair of axially spaced radially inwardly extending rails, and a wedge-shaped slot defined by said rails and said web, said piston ring having an axial extent corresponding to said axial extent of said first wave portion, whereby said second wave portion of said expander spring engages said slot of said piston ring with said outer periphery of said expander spring contacting said web, and said second wave portion and said piston ring selectively extend away from an outer peripheral surface of the piston body.

11. A piston ring assembly as recited in claim 10, wherein opposed slot-defining walls of said rails are inclined between three and seven degrees.

12. A piston ring assembly as recited in claim 10, wherein said web has a thickness between 0.022 and 0.028 inches.

13. A piston ring assembly as recited in claim 10, wherein said first and second wave portions share leading and trailing edges that extend between said inner and outer peripheries of said expander spring.

* * * * *